(12) United States Patent
Robinson (10) Patent No.: US 10,336,246 B2
(45) Date of Patent: Jul. 2, 2019

(54) INTEGRALLY LIGHTED TOW BAR

(71) Applicant: ROADMASTER, INC., Vancouver, WA (US)

(72) Inventor: David Robinson, Vancouver, WA (US)

(73) Assignee: Roadmaster, Inc., Vancouver, WA (US)

( * ) Notice: Subject to any disclaimer, the term of this patent is extended or adjusted under 35 U.S.C. 154(b) by 0 days.

(21) Appl. No.: 15/822,397

(22) Filed: Nov. 27, 2017

(65) Prior Publication Data

US 2018/0281667 A1 Oct. 4, 2018

Related U.S. Application Data

(60) Provisional application No. 62/477,561, filed on Mar. 28, 2017.

(51) Int. Cl.
| | |
|---|---|
| *B60Q 1/00* | (2006.01) |
| *B60Q 1/26* | (2006.01) |
| *B60Q 1/50* | (2006.01) |
| *B60D 1/167* | (2006.01) |

(52) U.S. Cl.
CPC ............ *B60Q 1/2661* (2013.01); *B60D 1/167* (2013.01); *B60Q 1/50* (2013.01)

(58) Field of Classification Search
CPC ......... B60Q 1/305; F21V 21/30; F21V 21/26; F21V 21/116; B60R 1/06
USPC .......................................................... 362/485
See application file for complete search history.

(56) References Cited

U.S. PATENT DOCUMENTS

| | | | |
|---|---|---|---|
| 6,886,968 B1 * | 5/2005 | Hamelink | B60D 1/58 280/163 |
| 2016/0129742 A1 * | 5/2016 | Erickson | B60D 1/58 280/400 |

* cited by examiner

*Primary Examiner* — Jamara A Franklin
(74) *Attorney, Agent, or Firm* — Erise IP, P.A.

(57) ABSTRACT

A tow bar assembly for towing a load with a vehicle providing a lighted region to warn other motorists on the road that the load is being towed and provide indications of the mode of operation of the towing vehicle. The integrated lights may be connected to the towing vehicle control signals indicating a turn signal, braking, or reverse. The tow lights also clearly display the tow bar that may otherwise be difficult to see at night and that the tow bar is towing a load.

20 Claims, 10 Drawing Sheets

INTEGRALLY LIGHTED TOW BAR

RELATED APPLICATIONS

This non-provisional patent application claims priority benefit, with regard to all common subject matter, of earlier-filed U.S. Provisional Patent Application No. 62/477,561, filed on Mar. 28, 2017, and entitled "INTEGRALLY LIGHTED TOW BAR." The identified earlier-filed provisional patent application is hereby incorporated by reference in its entirety into the present application.

Embodiments and/or features of the invention described in the present document may be used with the subject matter disclosed in commonly assigned and concurrently filed U.S. Pat. No. 15/822,410, and entitled "SUPPLEMENTAL BRAKE MONITORING SYSTEM." The concurrently filed patent application claims priority to earlier-filed U.S. Provisional Patent Application No. 62/426,753, filed on Nov. 28, 2016, and entitled "PROXIMITY SENSOR BASED SUPPLEMENTAL BRAKE MONITORING SYSTEM." The concurrently filed patent application and the previously filed provisional patent application are each hereby incorporated by reference in their entirety into the present application.

Embodiments and/or features of the invention described in the present document may be used with the subject matter disclosed in U.S. Pat. No. 6,619,686 issued Sep. 16, 2003, and entitled "FOLDING TOWBAR LOCK MECHANISM", U.S. Pat. No. 6,957,824 issued Oct. 25, 2005, and entitled "INTERLOCKING DEVICE", and U.S. Pat. No. 7,461,855 issued Dec. 9, 2008, and entitle "INTERLOCKING DEVICE FOR TELESCOPIC TOW BAR LEGS".

BACKGROUND

1. Field

Embodiments of the invention generally relate to a lighted tow bar. More specifically a lighted tow bar for coupling a towing vehicle to a car, trailer, or any other load for use on public roads.

2. Related Art

Generally, tow bars couple a towing vehicle to a load. A common example is a recreational vehicle ("RV") towing an automobile. This creates safety concerns. Other motorists, or pedestrians, may not notice the tow bar spanning between the towing vehicle and the towed vehicle as tow bars may be difficult to see. As such, the other motorists or pedestrians may not be able to see that the automobile is being towed instead of independently driven or may not see the vehicle at all. Typically, between the rear bumper of the towing vehicle and the rear bumper of the towed vehicle there are no lights. A vehicle driving next to the towing vehicle may change lanes directly behind the towing vehicle not realizing that a vehicle is being towed.

Providing a tow bar with an integral lighting system which can be tied into the tail lights, turn signals and/or brake lights of the towing vehicle may greatly enhance visibility and awareness. Existing solutions include mounting a set of large auxiliary lights to a towed vehicle or load, however the tow bar itself may be without light indicators. Additionally, tow bars often create pinch points and sharp bends which fray cables, creating electrical grounds and shorts for cable connectors. Wireless slave lights are also problematic, as they rely on batteries rather than the towing vehicle's power and suffer the same limitations regarding illuminating the span of the tow bar itself. Slave lights are typically magnetic but also could be connected to a tow bar by tape, wire, or other after-market method, but this leaves the lights vulnerable to separation from vibration, bumps, or bad weather. Existing solutions also utilize lighting element which consume excessive power. These lighting elements may be hardwired but in the event that the elements are battery powered, the life of the batteries is limited. Also, the existing solutions do not provide for side marker lights. Without being effectively positioned to indicate the presence and outline of the tow bar, the existing solutions may be disorienting to other motorists or pedestrians.

SUMMARY

Embodiments of the invention solve the above mention problems by providing an integrally lighted tow bar. Light strips may be connected to tow arms of the tow bar. The lights may be disposed within channels and may indicate the towing vehicle's mode of operation. The lighted tow bar indicates to other drivers that a load is being towed and may indicate the towing vehicle's mode of operation such as lighting, reverse, braking, turning, or when the hazard lights are on. The lights may be connected to the towing vehicle in a manner such that any indicator from the towing vehicle may be represented by the lighted two bar. The lighted tow bar illuminates the area near the side of the tow bar providing better visibility for the other motorists and pedestrians.

A first embodiment of the invention provides for a tow bar assembly comprising an outer tow arm connected to a linkage on a first end and telescopically connected to an inner tow arm on a second end. The linkage configured to attach to a towing vehicle and the inner tow arm is configured to attach to a load for towing. The outer tow arm comprises an exterior channel for housing a lighting strip, the lighting strip comprising lighting elements. The lighting elements illuminate indicative of a mode of operation of the towing vehicle.

A second embodiment of the invention provides for a tow bar assembly comprising an outer tow arm connected to a linkage on a first end and telescopically connected to an inner tow arm on a second end. The linkage configured to attach to a towing vehicle and the inner tow arm is configured to attach to a load for towing. A lighting element may be disposed on the tow arm. The outer tow arm further comprising a first interior channel for housing electrical cables and further comprising a second interior channel for housing tow cables.

A third embodiment of the invention addresses the above-described need by providing a tow bar assembly comprising an outer tow arm connected to a linkage on a first end and telescopically connected to an inner tow arm on a second end. The linkage configured to attach to a towing vehicle and the inner tow arm configured to attach to a load for towing. At least one lighting element disposed on the outer tow arm.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Use of directional terms such as "upper," "lower,", "top", "bottom", "above," "below", "front", "forward", "aft", "left" or "right", and etc. are intended merely for orientation, to describe the positions and/or orientations of various components of the invention relative to one another as the apparatus would be installed between a towing vehicle and a load vehicle, and are not intended to impose limitations on any position and/or orientation of any embodiment of the invention relative to any reference point external to the reference. It should also be noted that the terms tow object, vehicle to be towed, and load may be used interchangeably.

An integrally lighted tow bar as described in embodiments below may have two adjustable arms that, on one end, connect to a towing vehicle and on the other end connect to an object to be towed. The tow arms may be adjustable by pivoting about one, two, or three axes simultaneously. The tow arms may also have multiple telescoping parts. The wide variety of configurations allowed by the adjustability enable the tow bar to adjust to the towing vehicle as well as the object to be towed.

Referring to the figures, an integrally lighted tow bar is provided which incorporates lighting elements along the lateral regions of a vehicle tow bar. An integrally lighted tow bar may include movable towing arms, or a fixed tow bar geometry. The embodiments described below include left and right tow arms, which are similar and may or may not be exact mirror images. Though the lighting elements depicted are on the outer lateral regions, or sides, of the tow arm, the lighting elements may be on the top, bottom, sides, or there may be a plurality of lighting elements contained in lighting strips on all or any combination of top, bottom, or sides of the tow bar. Though the lighting elements depicted are in lighting strips, the lighting elements may be freely independent and there may be one, two, three, or any number of lighting elements. The lighting elements may be integral, or attached by magnets, screws, bolts, clamps, adhesives, or any other method that may be used to attach the lights.

Figure 1:
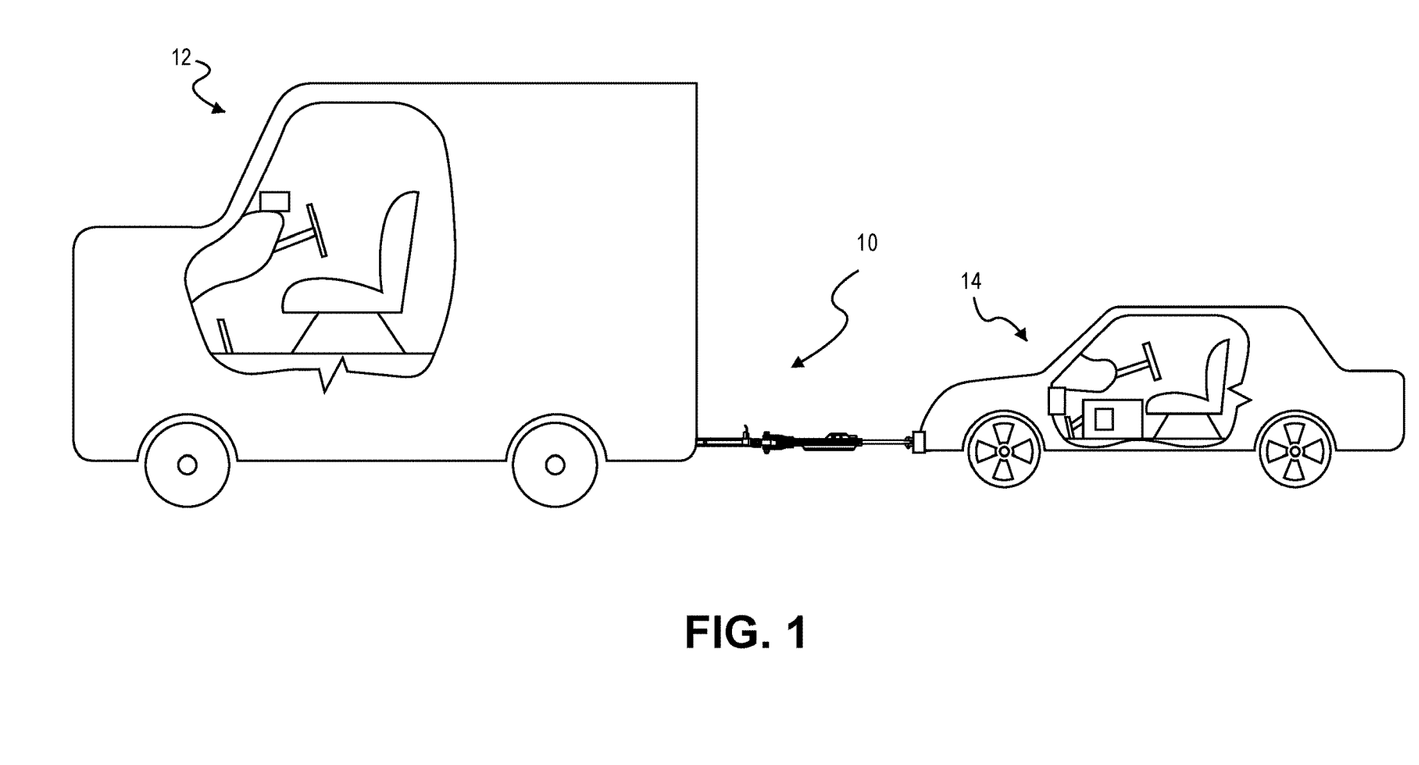
FIG. 1 depicts on embodiment of an integrally lighted tow bar attached to a towing vehicle and a towed vehicle.

FIG. 1 depicts an embodiment of an integrally lighted tow bar 10 disposed between a towing vehicle 12 and a towed vehicle 14. Though the towing vehicle 12 in FIG. 1 is a truck. However, the towing vehicle 12 may be a car, bicycle, snow mobile, or any vehicle capable of towing a load. Though the towed vehicle 14 depicted in FIG. 1 is a car, the towed vehicle 14 may be a truck, motorcycle, trailer, sled, or any object that may be towed. The towed vehicle 14 may also be referred to as a towed object, or load.

Figure 2A:
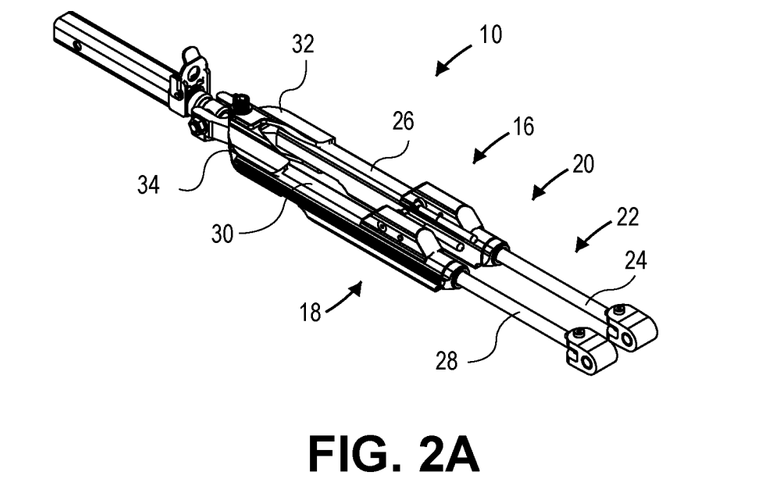
FIGS. 2A-D depict embodiments of an integrally lighted tow bar.

Referring to FIGS. 2A-2D, an exemplary embodiment of the integrally lighted tow bar 10 is shown. FIG. 2A depicts a perspective view of the lighted tow bar 10. Included is a left tow arm 16 and a right tow arm 18. Though two tow arms are depicted it should be noted that one, two, three, or any number of tow arms may be necessary to tow the towed object, or load, may be used. The left tow arm 16 and the right tow arm 18, as depicted in FIGS. 2A-2D, are in a position wherein the left tow arm 16 and the right tow arm 18 are parallel to one another. Generally, a tow arm may be configured with an outer tow arm 20 and an inner tow arm 22. A left inner tow arm 24 may be partially disposed within a left outer tow arm 26. Based on the length of the tow arm needed for attaching to the tow vehicle or for storage purposes, the length of disposition may be selected as the left inner tow arm 24 moves in a telescoping manner relative to the left outer tow arm 26. When the towing vehicle begins moving the left inner tow arm 24 may telescope to a fully extended position automatically engaging a locking mechanism. The locking mechanism may lock the left inner tow arm 24 in place relative the left outer tow arm 26. A right inner tow arm 28 and a right outer tow arm 30 may have the same or similar configuration and function to the left inner tow arm 24 and the left outer tow arm 26. The left outer tow arm 26 is configured with a left upper flange 32 and the right outer tow arm 30 is configured with a right upper flange 34.

Figure 2B:
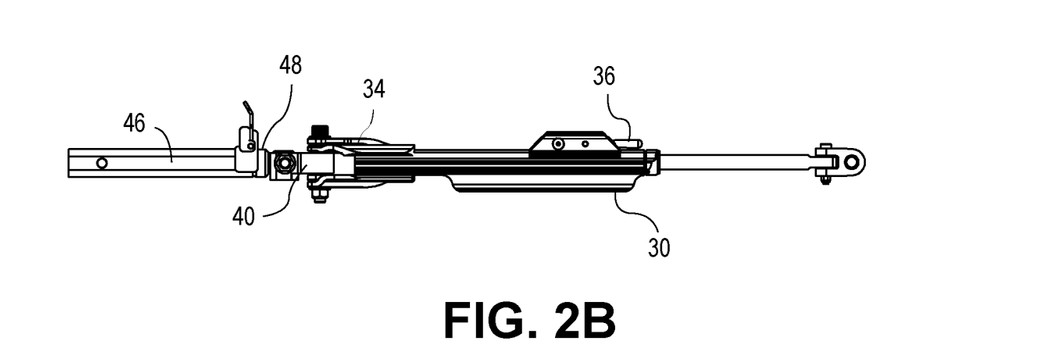
Figure 2C:
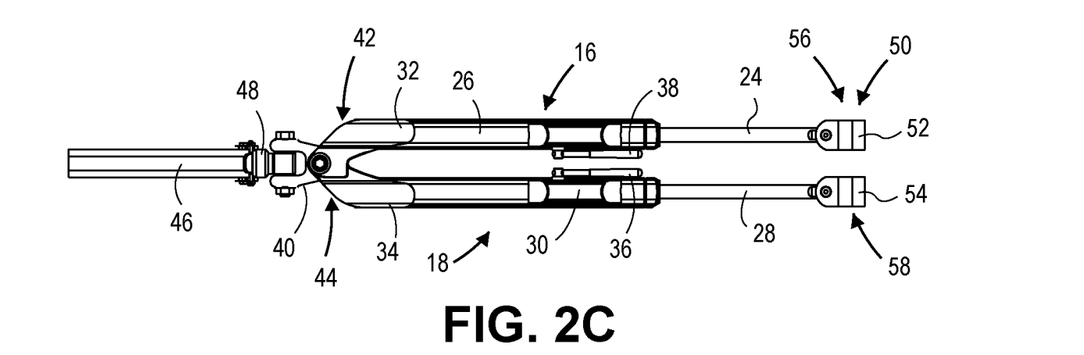

In FIG. 2B a right cylinder lock handle 36 can be seen disposed on the right outer tow arm 30. In FIG. 2C a left cylinder lock handle 38 is disposed on the left tow arm 16 and the right cylinder lock handle 36 is disposed on the right tow arm 18. The left cylinder lock handle 38 and the right cylinder lock handle 36 are rotated to selectively disengage the automatic locking mechanism causing the left inner tow arm 24 and the right inner tow arm 28, respectively, to be released from the automatic locking mechanism. In general, the left cylinder lock handle 38 or the right cylinder lock handle 36 may be a lever, a knob, a push button, or any other mechanism that may be used to disengage the locking mechanism.

In embodiments, as depicted in FIGS. 2B-C, the left tow arm 16 may be rotatably coupled to the right tow arm 18 and to a yoke coupling 40 at a respective first left tow bar terminal end 42 and a first right tow bar terminal end 44. The yoke coupling 40 is rotatably coupled to a stinger bar 46 by a two-axis rotatable coupling 48. The two-axis rotatable coupling 48 provides a rotatable coupling to the towing vehicle 12 which makes hookup easier and reduces risk of binding and/or warping when traveling over uneven ground or while turning. The multi-axis system also allows the vehicles to be disengaged easily without binding while stopped on uneven ground, or in a non-level, non-parallel position.

In embodiments, the stinger bar 46 couples to a tow hitch on a towing vehicle. Load couplings 50 comprising a left load coupling 52 and a right load coupling 54 which are provided at a respective second left tow bar terminal end 56 and a second right tow bar terminal end 58. The load couplings 50 are configured to selectively couple the tow bar 10 to the towed vehicle 14 or trailer, or load, either by a cross bar (not shown) or directly to the load.

Figure 2D:
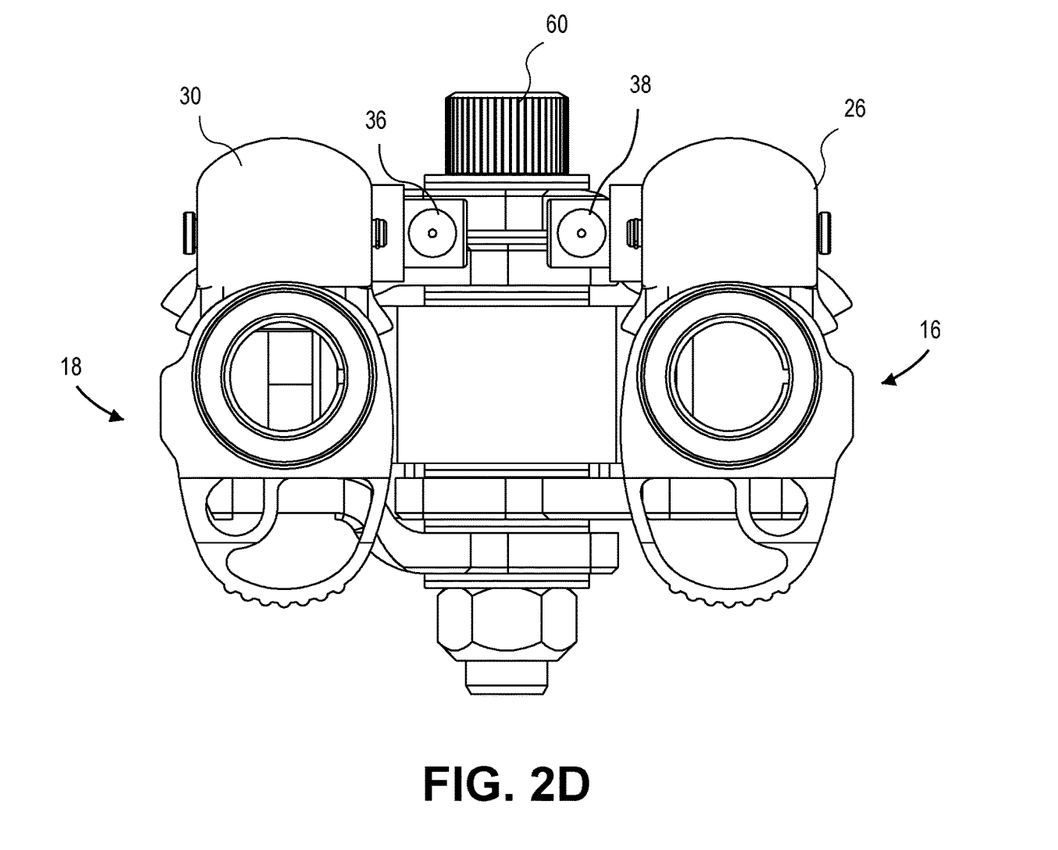

FIG. 2D is a front side view of the tow bar 10. In the embodiment depicted, the left tow arm 16 comprising the left outer tow arm 26 is visible. The upper protrusion of the left outer tow arm 26 houses the left automatic locking mechanism and the left cylinder lock handle 38 may be used to release the left automatic lock. The right tow arm 18 comprising the right outer tow arm 30 is also visible. The upper protrusion of the right outer tow arm 30 houses the right automatic locking mechanism and the right cylinder lock handle 36 may be used to release the right automatic lock. In the embodiment depicted in FIG. 2D, the left tow arm 16 and the right tow arm 18 are parallel. The left tow arm 16 and the right tow arm 18 may pivot around the pivot pin 60.

Figure 3:
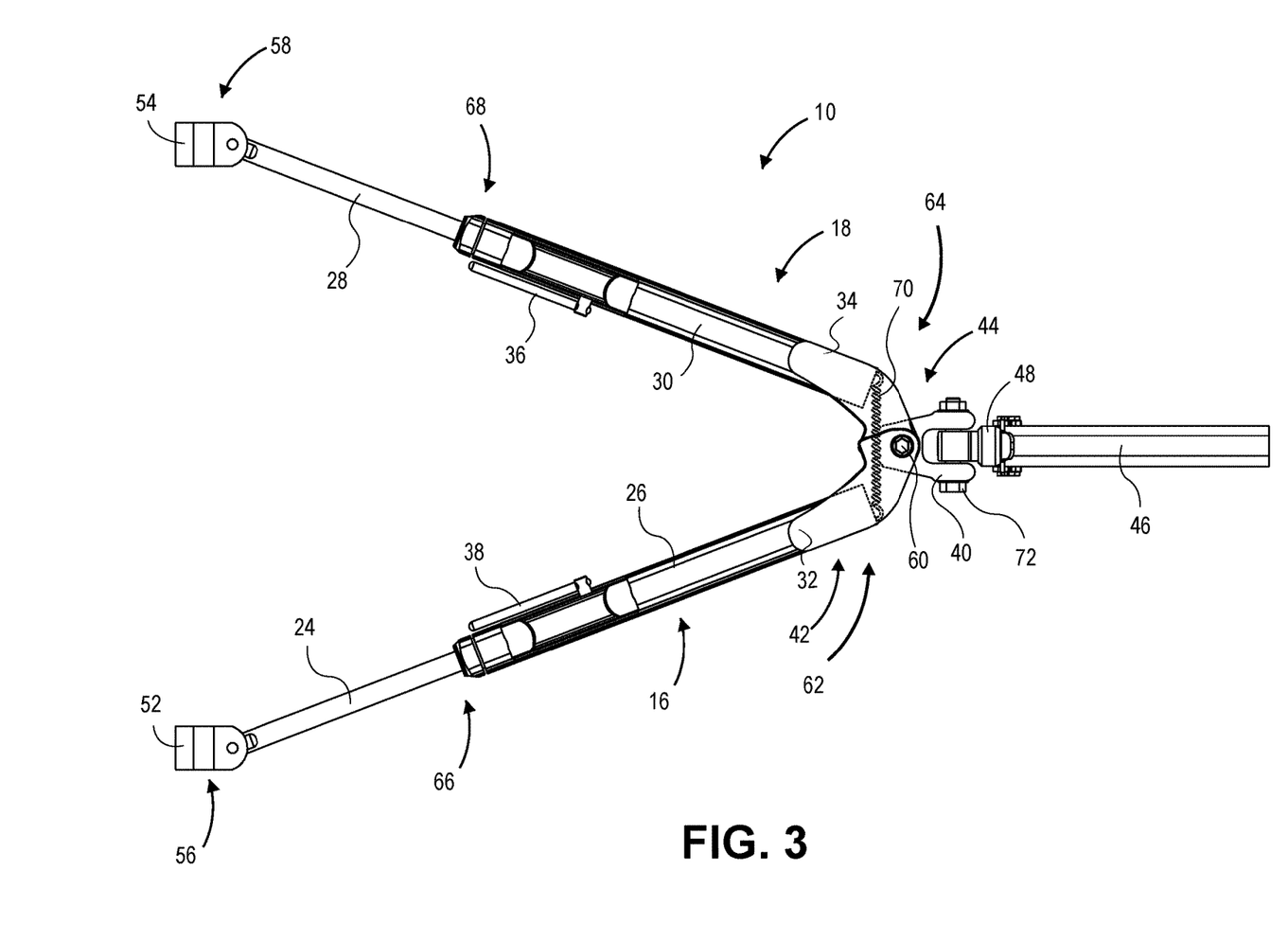
FIG. 3 depicts an embodiment of a top view of an integrally lighted tow bar in a deployed position.

An exemplary embodiment of the invention in FIG. 3 depicts the tow bar 10 in operating position presenting a Y-shaped configuration. The left tow arm 16 and the right tow arm 18 may be adjustable such that the angle between the two is selectively changeable. The tow left tow arm 16 and right tow arm 18 may be adjusted to meet the requirements to tow a load of a particular width. The left load coupling 52 and the right load coupling 54 may also be adjusted to remain parallel with each other or to be angled to attach to the load to be towed at an angle dictated by a load attachment. The left load coupling 52 and the right load coupling 54 are provided at the respective second left tow bar terminal end 56 and the second right tow bar terminal end 58 to selectively couple tow bar 10 to the towed vehicle, trailer, or load, either by a cross bar (not shown) or directly to the load.

The left inner tow arm 24 and the right inner tow arm 28 may also be adjusted to provide a length exposed from the left outer tow arm 26 and the right outer tow arm 30 to allow another level of freedom while attaching the towed vehicle. When the towing vehicle moves forward, the left inner tow arm 24 and the right inner tow arm 28 may extend to a fully extended position thereby engaging the automatic locking mechanisms and locking the left inner tow arm 24 and the right inner tow arm 28 into place relative left outer tow arm 26 and right outer tow arm 30. In embodiments, the left inner tow arm 24 and the right inner tow arm 28 may be rotatable in relation to the left outer tow arm 26 and the right outer tow arm 30 around their respective longitudinal axes. The left outer tow arm 26 and the right outer tow arm 30 extend from a respective left front outer tow arm end 62 and a front right outer tow arm end 64 to a respective aft left outer tow arm end 66 and an aft right outer tow bar end 68.

In embodiments, lights may be mounted on or in the left outer tow arm 26 and the right outer tow arm 30. The lights are connected using a spiral-wound flex cable 70. Although a spiral-wound flex wire is depicted in the embodiments, a strait wire, or any other wire may be used. In embodiments, the left tow arm 16 and the right tow arm 18 are rotatably coupled to each other and to the yoke coupling 40 at a respective first left tow bar terminal end 42 and a first right tow bar terminal ends 44. The yoke coupling 40 provides rotation of the left tow arm 16 and the right tow arm 18 about an axis defined by the pivot bolt 60. Under standard operating procedure the axis defined by the pivot bolt 60 may be substantially vertical. The yoke coupling 40 also provides rotation of the two-axis rotatable coupling 48, relative to the yoke coupling 40, about an axis defined by a rotational coupling 72. Under standard operating conditions the axis defined by the rotational coupling 72 may be substantially perpendicular to the axis defined by the pivot bolt 60. The tow bar pivot bolt 60 and the rotational coupling 72 may be bolts, pins, bearings or any other attachment or combination of attachments that may allow free rotation or may be locked into place. The two-axis rotatable coupling 48 provides an axis of rotation that may be substantially perpendicular to the axes defined by the pivot bolt 60 and the rotational coupling 72 under normal operating procedure. The rotatable devices may be rotated about all axes simultaneously, two axes simultaneously, or each axis independently while one or two of the other couplings are locked.

Although a multi-axis linkage is used in embodiments it is not limiting. The lighting elements and the lighting strips along with any embodiments may be used with a fixed frame tow bar. A ball and coupler hitching mechanism, a one rotation axis, two rotation axes, or any other mechanism or combination of mechanisms may be used. The lighting elements and lighting strips may also be used with hitch extensions, electrical cable extensions, or any other combination of tow bars, hitches, and extensions that may be used.

Figure 4:
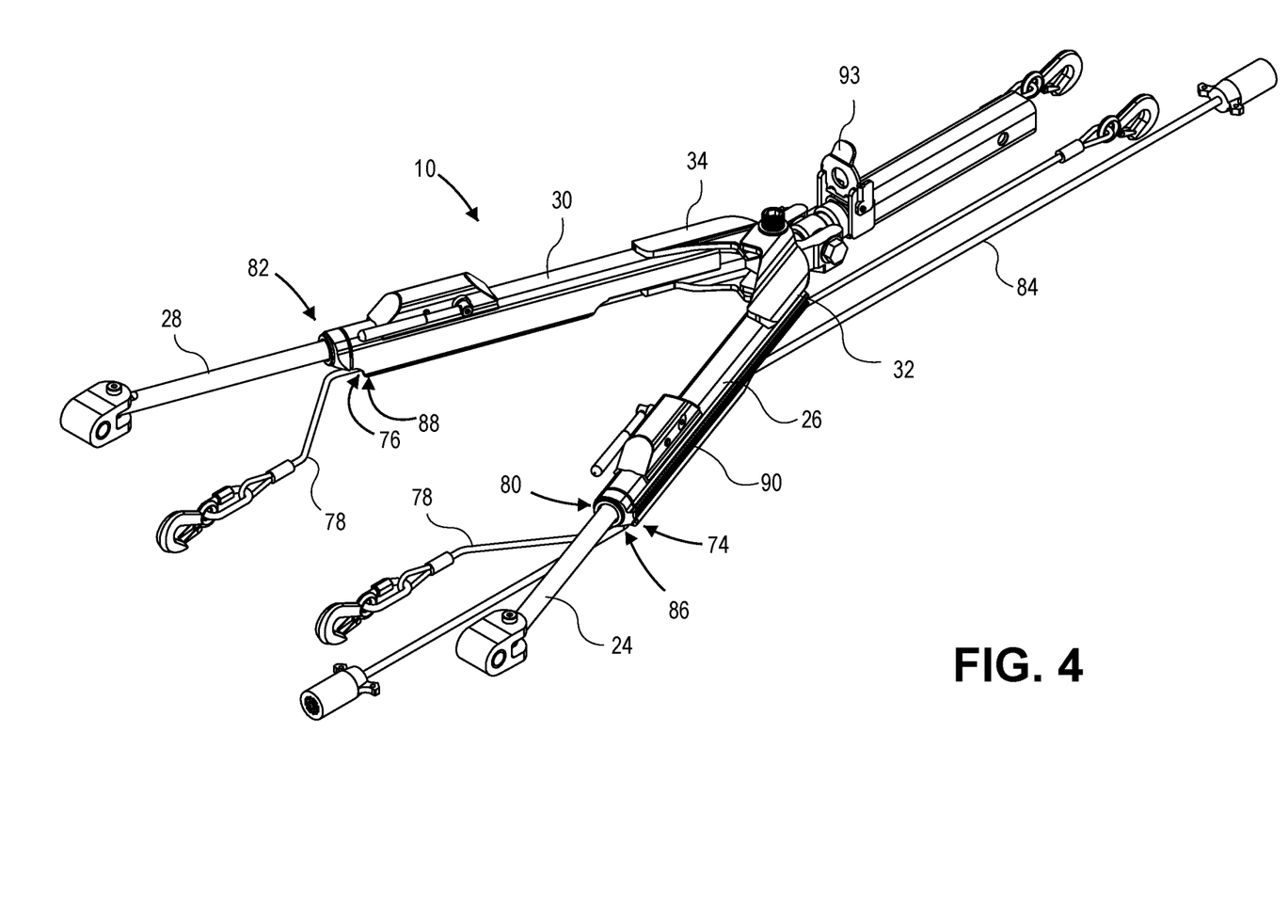
FIG. 4 depicts a perspective view of an embodiment of an integrally lighted tow bar in a deployed position.

In another exemplary embodiment depicted in FIG. 4, each of the left outer tow arm 26 and the right outer tow arm 30 include a left interior support channel 74 and a right interior support channels 76, respectively. The left interior support channel 74 and the right interior support channel 76 provide a shielded routing channel for safety cables 78 spanning between the towing vehicle 12 and the towed vehicle 14, in case the primary towing couplings fail. It should be noted that the safety cables 78, in embodiments, may or may not be necessary depending on the load, and/or regulations. The tow bar 10 may be fully operational with or without the safety cables 78. The left interior support channel 74 and the right interior support channel 76, respectively, also provide additional longitudinal/bending strength to the left outer tow arm 26 and the right outer tow arm 30. A left interior channel 80 and a right interior channel 82 act as sleeve guides to receive and support the left inner tow arm 24 and the right inner tow arm 30. Along with the safety cables 78, also depicted in FIG. 4 is a multi-wire electrical cable 84. The multi-wire electrical cable carries electricity from the towing vehicle to the load. This provides the load with the necessary power and signals to operate lights, blinker, reverse lights, signals, cameras, reverse noise signals, or any other audio or visual indicators that may be necessary while towing a load. The multi-wire electrical cable may also be compatible with a Controller Area Network (CAN) bus. The multi-wire electrical cable 84 may run through a left interior electrical channel 86 in the left outer tow arm 26 and a right interior electrical channel 88 in the right outer tow arm left outer tow arm 26 most easily viewable in FIG. 6. As depicted in the embodiment presented in FIG. 4, the multi-wire electrical cable is running through the left interior electrical channel 86. The left interior electrical channel 86 and the right interior electrical channel 88 may best be viewed in FIGS. 6 and 8. The multi-wire electrical cable provides power and signals to a left light strip 90 on the left outer tow arm 26 and a right light strip 92 (not shown) on the right outer tow arm 30 left outer tow arm 26. Also, depicted in FIG. 4, is the left upper flange 32 overlapping the right upper flange 34, and a stored locking mechanism 93.

Figures 5A, 5B:
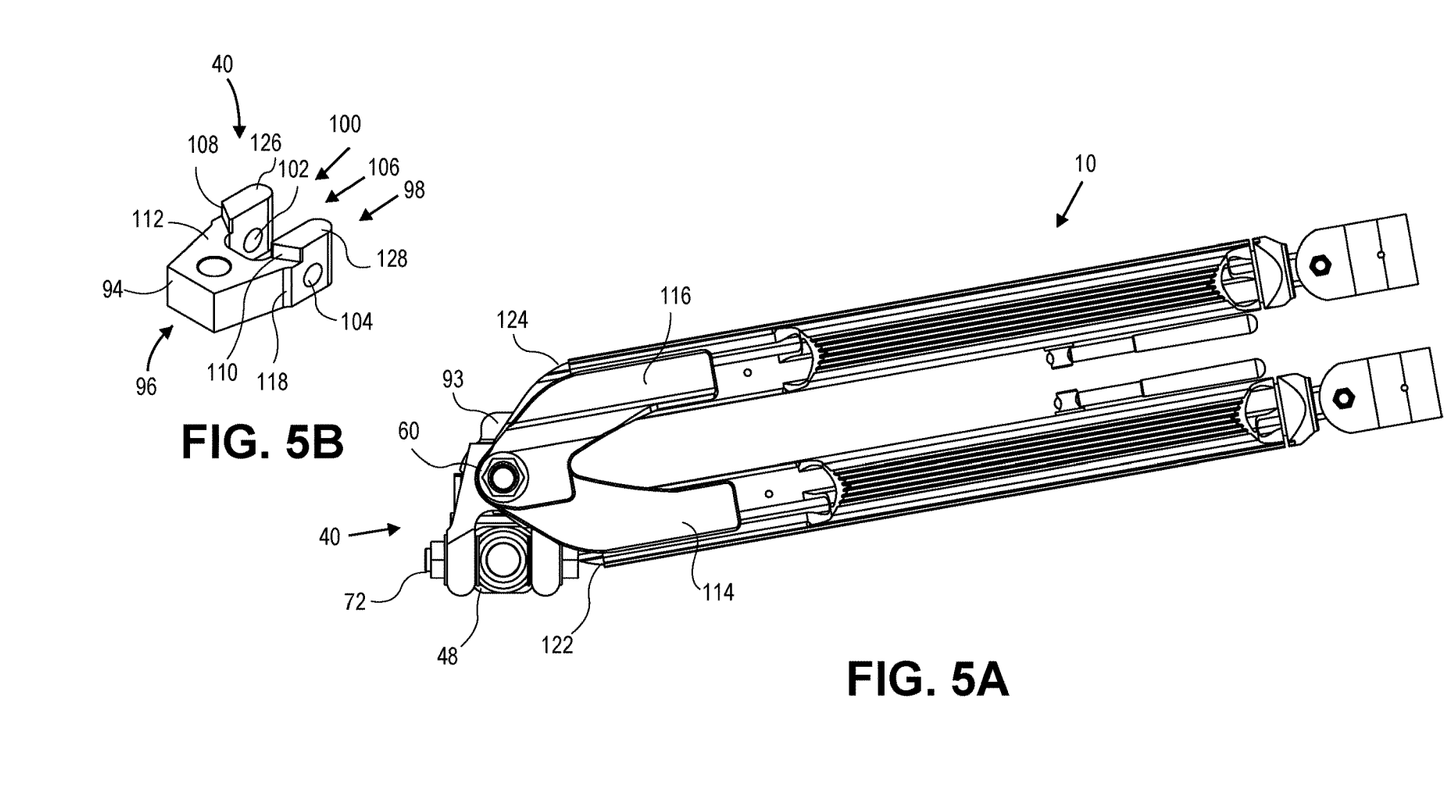
FIGS. 5A-B depicts a bottom view of an embodiment of an integrally lighted tow bar and a perspective view of a yoke coupling.

An exemplary embodiment depicted in FIG. 5A presents the tow bar 10 in a stored position and an embodiment depicted in FIG. 5B presents the yoke coupling 40. The yoke coupling 40 includes an aft face 94 at an aft portion 96 for coupling to the tow bar 10 by way of the tow bar pivot bolt 60 providing a rotational connection for yaw, and to facilitate compact stowage. The rotational adjustability also provides for variation in the size and shape of loads that may be towed. A left projection 98 and a right projection 100, with corresponding left and right horizontal through channels 102 and 104, respectively, is configured to receive the rotational coupling 72 therethrough at a forward portion 106 of the yoke coupling 40. The rotational coupling 72 rotatably couples the yoke coupling 40 to the two-axis rotatable coupling 48 as seen best in FIGS. 2A-C and FIG. 3. The two-axis rotatable coupling 48 may be coupled to the stinger bar 46 at the forward portion 106 further providing a pitch rotation relative to the yaw rotation provided by the pivot bolt 60. The rotational coupling 72 may define the pitch rotation axis under ordinary use. Each of the left and the right projections 98 and 100 include a left lower shoulder projection 108 and a right lower shoulder projection 110, respectively, projecting nominal to a bottom surface 112 and oriented at an angle to engage flush against the forward edge of a left lower flange arm 114 and a right lower flange arm 116, respectively, depicted in FIG. 5A, when fully rotated left or right. Each of the left projection 98 and the right projection 100 further include a side shoulder, a left side shoulder 118 and a right side shoulder 120 (not shown), projecting at an angle to engage flush against a respective left forward end 122 and a right forward end 124 of left outer tow arm 26 and the right outer tow arm 30, respectively, when fully rotated left or right. The fully rotated position may facilitate a stowed configuration in which the tow bar is also raised into a vertical locked position perpendicular to the roadway. The stored locking mechanism 93 may interact with pivot bolt 60 to lock the tow bar in the stored vertical position.

The provision of a single-piece solid yoke, having at least two sets of shoulders arranged along the lateral sides and the bottom or top side which simultaneously impinge against the tow arms more evenly distributes the force transmitted during minimum radius turns, reducing torque forces around the longitudinal axes, and reducing the tendency of overlapping flanges to bow or buckle as the force is distributed between the outer flange edge faces and interior cylinder faces. In embodiments, the forward portion 106 includes a substantially parallel a left bottom surface 126 and a substantially parallel a right bottom surface 128, respectively, to insert between and act as bearing surfaces against the left upper flange 32 and the right upper flange 34 as seen best in FIG. 2A and the left lower flange arms 114 and the right lower flange arm 116.

Figure 6:
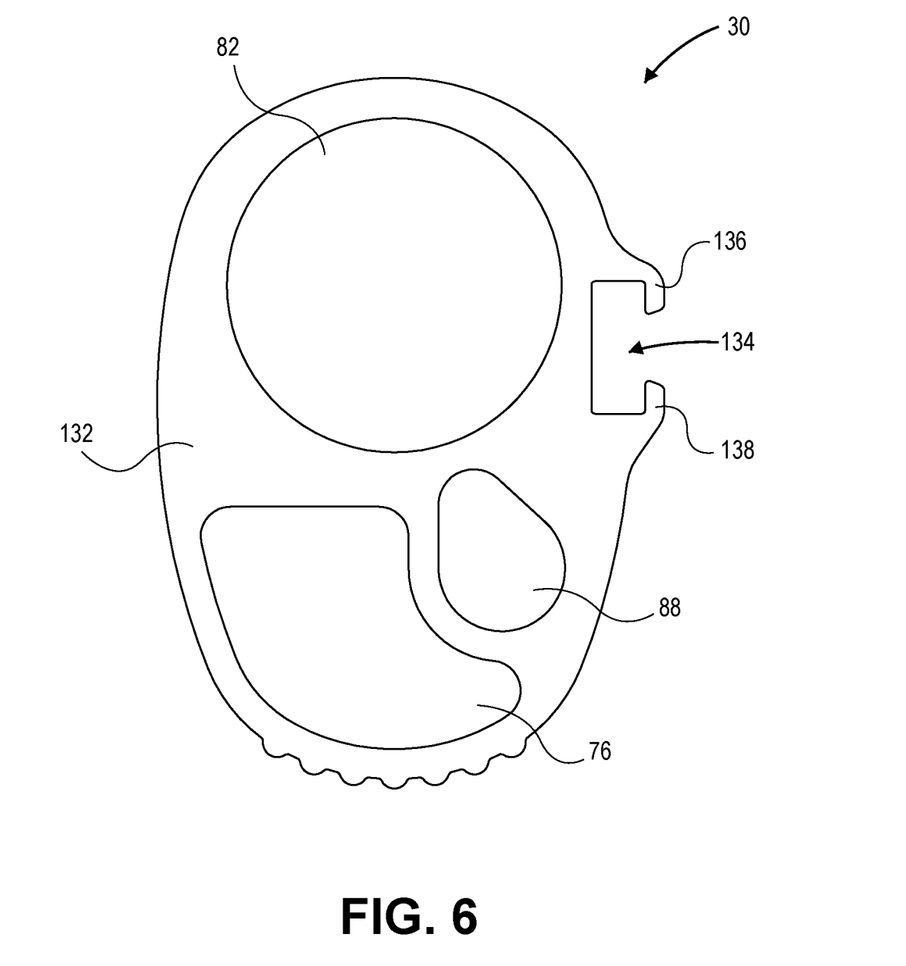
FIG. 6 depicts a cross section view of an embodiment of an outer tow arm.
Figure 8:
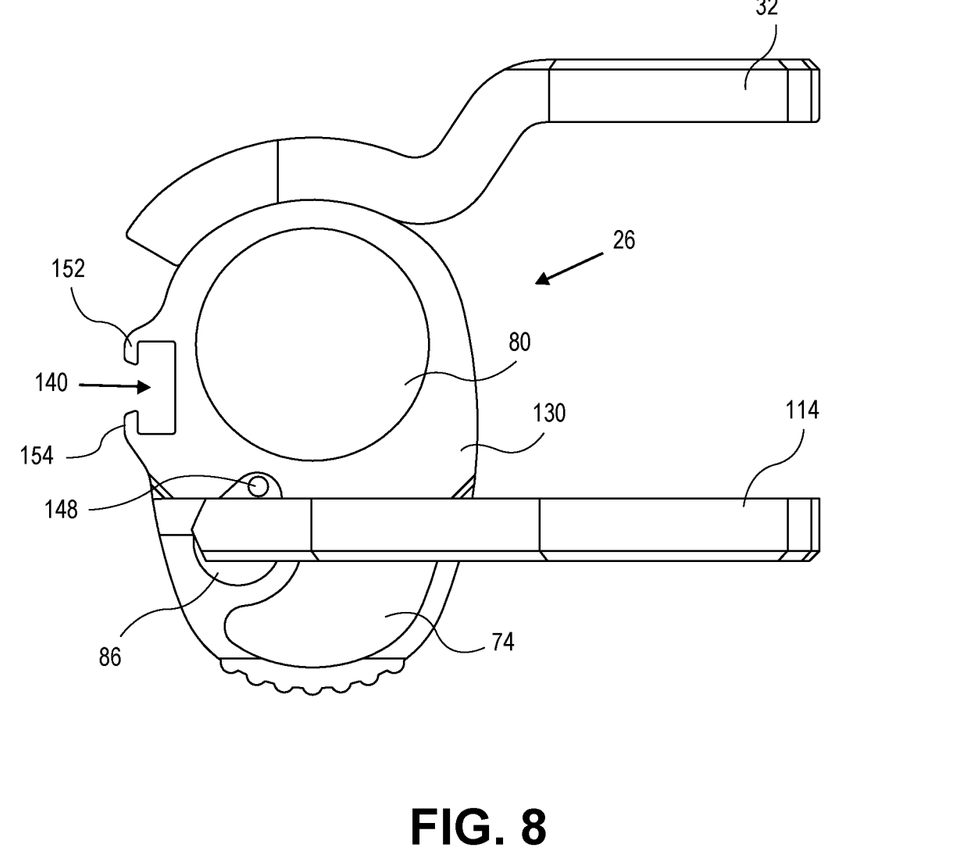
FIG. 8 depicts a cross section view of an embodiment of an outer tow arm.

In embodiments, the right outer tow arm 30 includes an expanded left cross section 130, depicted in an embodiment in FIG. 8, and an expanded right cross section 132, depicted in an embodiment in FIG. 6, extending part of the length of the left outer tow arm 26 and the right outer tow arm 30. In general, as depicted in FIGS. 6 and 8, the expanded left cross section 130 and the expanded right cross section 132 provide increased strength, and include the interior channels 80, 82, and 74, 76 and 86, 88. The left Interior channel 80 and the right interior channel 82 act as sleeve guides to receive and support the left inner tow arm 24 and the right inner tow arm 28 respectively. The left interior support channel 74 and the right interior support channel 76 provide a shielded routing channel for the safety cables 78 spanning between the towing vehicle 12 and the towed vehicle 14. The left interior electrical channel 86 and the right interior electrical channel 88 provide a through channel for the multi-wire electrical cable 84.

Turning now to an embodiment depicted in FIG. 6 featuring the expanded right cross section 132 of the right outer tow arm 30. The right Interior electrical channel 88 may provide a shielded cableway for the multi-wire electrical cable 84. In embodiments, the multi-wire electrical cable 84 may provide control communication between the lights, hazard lights, brake, tail, and turn signal light circuit in the towing vehicle and the lights, hazard lights, brake, tail, and turn signal lights in the load vehicle or between any electrical mechanism in the load and towing vehicles. The right interior channel 82 acts as sleeve guide to receive and support the right inner tow arm 28. The right interior support channel 76 provides a shielded routing channel for the safety cables 78 spanning between the towing vehicle 12 and the towed vehicle 14, in case the primary towing couplings fail. The right interior support channel 76 also provides additional longitudinal/bending strength to the left outer tow arm 26. A right exterior channel 134 extends longitudinally along the exterior of the right outer tow arm 30. The right exterior channel 134 may be partially enclosed by a right upper lip 136 and a right lower lip 138. In embodiments, there may be one lip, either the right upper lip 136 or the right lower lip 138. The right upper lip 136 and the right lower lip 138 may be adjustable by rotation or telescoping. The right upper lip 136 and the right lower lip 138 may span the full length of the right outer tow arm 30 or may only span the partial length of the right outer tow arm 30. In embodiments, the right exterior channel 134 may house the right light strip 92. The right upper lip 136 and the right lower lip 138 may aid in securing the right light strip 92 in the right exterior channel 134. In embodiments, there may be no lips and the right light strip 92 may be held in place by an adhesive such as glue, tape, surface area adhesive, or any other such adhesive that may hold the right light strip 92 in the right exterior channel 134. The right light strip 92 may also be held in the right exterior channel 134 and protected by a cover. The cover may be plastic, glass, decorative, customizable, or any other transparent or translucent cover. In alternative embodiments, there may be flange arms attached to the right outer tow arm 30.

In embodiments, the lighting elements 142 may not be disposed within lighting strips 90 and 92. The light elements 142 also may be added on to the tow bar 10 rather than being disposed within a channel. The lighting elements 142 may be independently displayed or may be one, two, three, or any amount of lighting elements displayed on any one or any combination of sides of the tow bar 10. The lighting elements 142 may be LED, incandescent, halogen, helium, lithium, neon, laser, or any kind of bulb, gas, or filament that may be visible and attached to the tow bar 10. The lighting elements may be attached by bolts, screw, claps, wires, adhesives, or any other method that may securely attach the lighting elements 142 to the tow bar 10.

Figure 7:
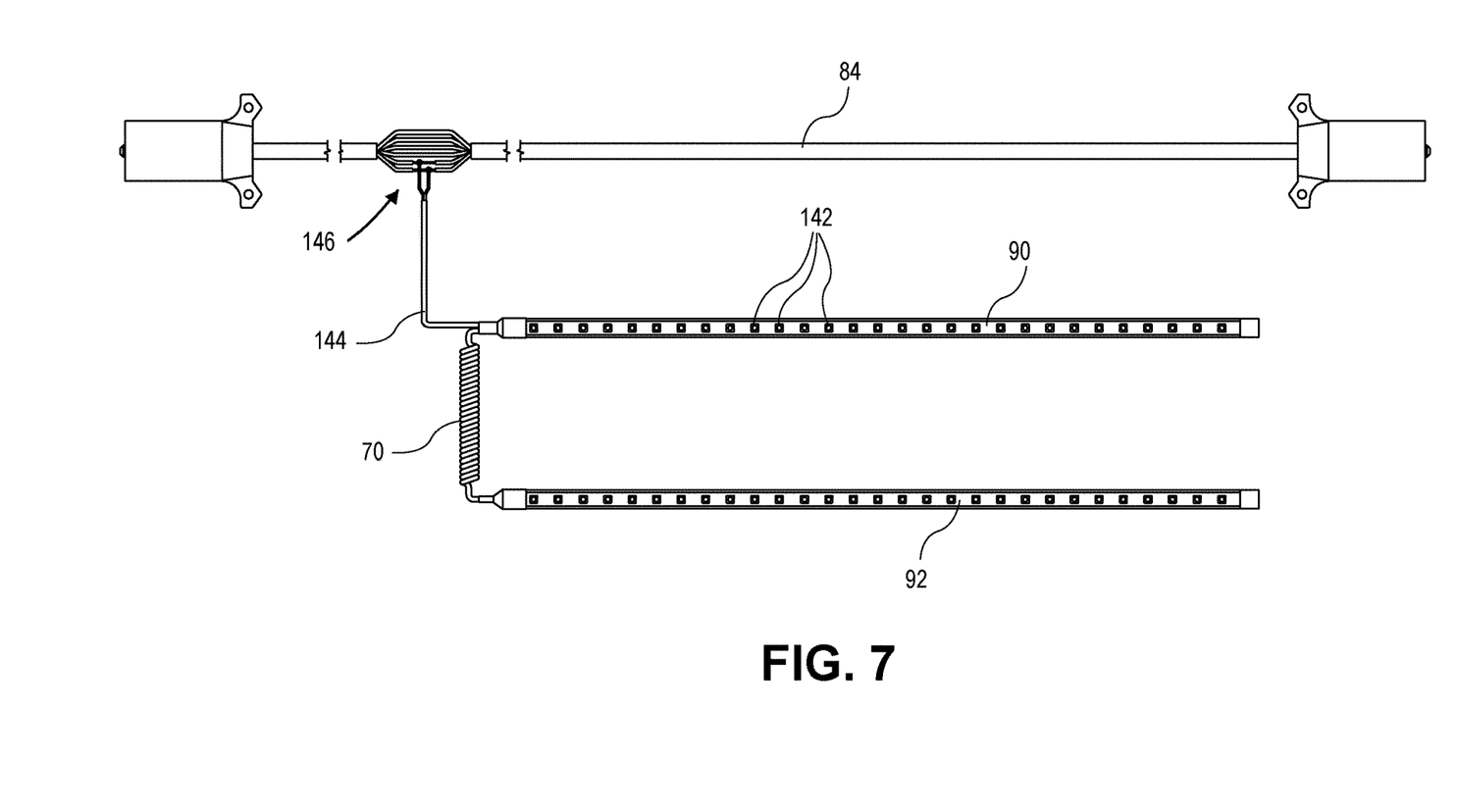
FIG. 7 depicts an embodiment of electrical cables and light strips.

Referring to the exemplary embodiment depicted in FIG. 7. The right exterior channel 134 and a left exterior channel 140 extend longitudinally along the exterior of respective left outer tow arm 26 and the right outer tow arm 30, may be configured to receive the left light strip 90 and the right light strip 92. In embodiments, the left light strip 90 and the right light strip 92 are low-voltage LED light strips which include a plurality of LED lighting elements 142. In embodiments, the left exterior channel 140 and the right exterior channel 134 may be angled downward, at approximately 45 degrees, thereby angling the left light strip 90 and the right light strip 92 downward. The right exterior channel 134 and the left exterior channel 140 may be angle downward at any other angle or may not be angle and yet further may be angled upward. Display of the left light strip 90 and the right light strip 92 to passengers of other vehicles may be performed in any way that enables the passengers to best view the lights.

The left exterior channel 140 and the right exterior channel 134 may be disposed on any side of the left outer tow arm 26 and the right outer tow arm 30, respectively. The left exterior channel 140 and the right exterior channel 134 housing the left light strip 90 and the right lighting strip 92 may be on the top, bottom, or either the inside or the outside of the left outer tow arms 26 and right outer tow arm 30, respectively. Channels may also be on any combination of sides or there may be multiple channels allowing for light strips to be on multiple sides, or combination of top, bottom, and sides, including all top, bottom, and sides, simultaneously.

The lighting elements 142 may be LED, incandescent, halogen, helium, lithium, neon, laser, or any kind of bulb, gas, or filament that may be visible and small enough for the intended purpose. The lighting elements may be any color of light or may be a tinted cover or film providing a colored display of the light. The lights may be indicative of the mode of operation of the vehicle such as lighting, braking, turning, reversing, engaging hazard lights, or any other mode that may be indicated. The lighting elements may illuminate in sequence or may be preprogrammed.

Continuing with the exemplary embodiment depicted in FIG. 7, alternative control schemes could also be utilized. The individual lighting elements 142, or groups thereof, could be independently controlled, with some elements mimicking the condition of the towing car tail lights, some mimicking the brake lights, some mimicking the turn signals, and/or emitting a different pattern depending on conditions, such as a cascading sequence, blinking or lighting according to a preprogrammed pattern. The lighting elements 142 could emit different color light under specified conditions, such as red for braking and amber for turn signals. Such control can be provided directly from an auxiliary brake system controller by spliced cables, or by an intelligent signal to an LED strip controller mounted coextensively with the left and right light strips 90 and 92. The multi-wire electrical cable 84 couple the brake, tail and signal light circuits in the towing vehicle to auxiliary indicators attached to the load and/or to an auxiliary/remote braking system installed in a load vehicle.

Though the lighting elements 142 depicted in FIG. 7 are disposed within the left and right lighting strips 90 and 92, the lighting elements 142 may be disposed on the tow bar 10 not in a strip. The lighting elements may be independent and may have multiple lights disposed on the left and right outer tow arms 26 and 30. The lighting elements 142 may be independently displayed or may be one, two, three, or any amount of lighting elements displayed on any one or any combination of sides of the tow bar 10. The lighting elements 142 may be LED, incandescent, halogen, helium, lithium, neon, laser, or any kind of bulb, gas, or filament that may be visible and attached to the tow bar 10. The lighting elements may be attached by bolts, screw, claps, wires, adhesives, or any other method that may securely attach the lighting elements 142 to the tow bar 10.

A spliced cable 144 may be spliced into the multi-wire electrical cable 84 and electrically connects to the light strips 90 and 92, such that the left and right light strips 90 and 92 mimic the condition of the tail lights of the towing vehicle 12 (i.e. on, off, blinking). In embodiments, the spiral-wound flex, or straight cable 70 couples the left and right light strips 90 and 92, which may be light emitting diodes. In embodiments, the spiral-wound flex cable 70 is routed between the left upper flange 32 and the left lower flange arms 114. A splice region 146 may be located in a protected region of either, or both, the left and the right interior electrical channels 86 and 88.

Turning now to FIG. 8 depicting an embodiment of the left outer tow arm 26, the left cross section 130, the left upper flange 32, and the left lower flange 114. In embodiments, each of the left and the right outer tow arms 26 and 30 include left upper flange 32 and the right upper flange 34 and opposed the left and the right lower flange arms 114 and 116 extending from the left and right outer tow arms 26 and 30 proximate first left tow bar terminal end 42 and the first right tow bar terminal end 44. Though the left outer tow arm 26 is depicted in FIG. 8, it should be noted that the right outer tow arm 30 may have corresponding features as those described herein, and may be similar to, or a mirror image of, the left outer tow arm 26 with the left upper flange 32 and the right upper flange 34 overlapping in the region of the yoke coupling 40 and the left lower flange arm 114 and the right lower flange arm 116 overlapping in the region of yoke coupling 40. Overlapping of the left lower flange arm 114 and the right lower flange arm 116 can be seen in FIG. 5A and the overlapping of the left upper flange 32 and the right upper flange 34 can be seen in FIGS. 2A-D.

A cross section view of an embodiment of the left outer tow arm 26 is depicted in FIG. 8. In embodiments, the left interior electrical channel 86 provides a protected cableway for the multi-wire electrical cable 84. The cross section of left interior electrical channel 86 may be ovoid, roughly egg-shaped, with the narrow portion continuing beyond the expanded left cross section 130 to form a left cable recess channel 148 extending along the bottom of the left outer tow arm 26. A right cable recess channel 150 may extend along the right outer tow arm 30. The left interior channel 80 acts as sleeve guide to receive and support the inner tow arm 22. The left interior support channel 74 provides a shielded routing channel for the safety cables 78 spanning between the towing vehicle 12 and the load 14, in case the primary tow couplings fail. The left interior support channel 74 also provides additional longitudinal/bending strength to the outer tow arm 20. The left exterior channel 140 extends longitudinally along the exterior of the left outer tow arm 26 to receive the light strip 90. The left exterior channel 140 may be partially enclosed by a left upper lip 152 and a left lower lip 154. In embodiments, there may be one left upper lip 152 or one left lower lip 154. The lips left upper lip 152 and the left lower lip 154 may be adjustable by rotation or telescoping. The left upper lip 152 and the left lower lip 154 may span the full length of the left outer tow arm 26 or may only span a partial length of the left outer tow arm 26. In other embodiments, there may be no lips and the light strip 90 may be held in place by an adhesive such as glue, tape, surface area adhesive, or any other such adhesive that may hold the light strip 90 in the left exterior channel 140. The light strip 90 may also be held in the left exterior channel 140 and protected by a cover. The cover may be plastic, glass, decorative, customizable, or any other transparent or translucent cover.

Referring to FIGS. 4, 5A-B, 6 and 8, in embodiments, the left outer tow arm 26 includes the left cable recess channel 148 extending from proximate the left front outer tow arm forward end 62 to proximate the aft left outer tow arm end 66. The right outer tow arm 30 includes the right cable recess channel 150 extending from proximate right front outer tow arm end 64 to proximate the aft right outer tow arm end 68 as depicted in FIG. 5A, which routes and protects the spliced cable 144 providing electrical connection from the spiral-wound flexible cable 70 to the left light strip 90 and the right light strip 92. A cutaway notch (not shown) is provided at the forward end of the left cable recess channel 148 as depicted in FIG. 8, to prevent cables being crushed between the left front outer tow arm end 62 and the right front outer tow arm end 64. The yoke coupling 40 contacts surfaces lower shoulder projections 97 and 99 (not shown) and the left lower shoulder projection 108 and the right lower shoulder projection 110 in FIG. 5B. A cutaway notch may be provided at the forward end of each the left exterior channel 140 and the right exterior channel 134. In embodiments, the left lower flange arm 114 and the right lower flange arm 116 overlap the forward portion of the left cable recess channel 148 as shown in FIG. 8, and the right cable recess channel 150 (not shown).

In embodiments, each and every feature of the left outer tow arm 26 may have similar corresponding components on the opposing right outer tow arm 30. The left outer tow arm 26 and the right outer tow arm 30 may be similar, or mirror images of each other, or the left outer tow arm 26 may have components that the right outer tow arm 30 does not have, or vice versa.

In embodiments, the multi-wire electrical cables 84 couples the brake, tail and signal light circuits and ground wires in the towing vehicle to auxiliary indicators attached to the load and/or to an auxiliary/remote braking system installed in a load vehicle. In embodiments, the left interior electrical channel 86 and right interior electrical channel 88 incorporate and expand from the left cable recess channel 148 and the right cable recess channel 150, creating ovoid-shaped cross sections. The ovoid-shaped cross sections provide a snug fitting channel to route the multi-wire cable 84 with the spliced cable 144 alongside, and with the splice region 146 in a protected location within the left interior electrical channel 86 and the right interior electrical channel 88. In embodiments, pressure-relieving grommet seals (not shown) are provided at the forward and aft outlets of the left interior electrical channel 86 and the right interior electric channel 88. The grommet seals may be rubber, plastic, silicone or any other type seal that provides protection to electrical cables. The grommet seals may wrap around the cables and be cinched or may be connected to the wall of the channel. Further, the multi-wire electrical cable 84 and the spliced cable 144 may be wrapped together or separate in a heat shrink wrap or seal. Tinning may be performed on the wires before sealing to add yet a further layer of water protection. Silicone or other sealant may be injected into heat shrink seal around the spliced cable 144, where the multi-wire electrical cable 84 is spliced into the spliced cable 144, for further protection.

Figure 9:
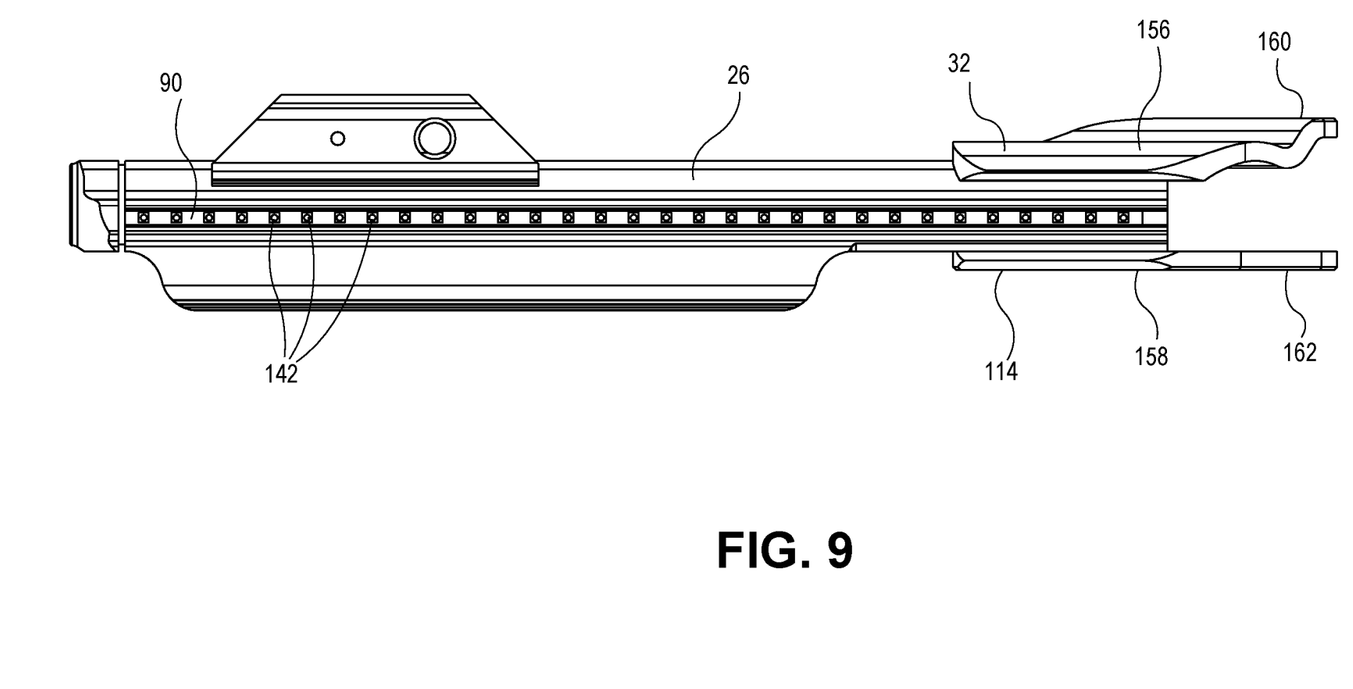
FIG. 9 depicts a side view of an embodiment of an outer tow arm.

FIG. 9 depicts a side view of an embodiment of the left outer tow arm 26. The left light strip 90 presenting the lighting elements 142 are visible. The left outer tow arm 26 comprises the left upper flange 32 and the left lower flange arm 114, a first upper left portion 156 and a first lower left portion 158, and a second upper left portion 160 and a second lower left portion 162. It should be noted that, though not shown, the right outer tow arm 30 may have similar corresponding components, namely: the upper right flange arm 34 and the right lower flange arm 116 extend from a respective first upper right portion 164 and a second upper right portion 168, respectively, connected to the right outer tow arm 30, to a respective first lower right portion 166 and a second lower right portion 170.

The left flange arm second upper left portion 160 and the corresponding second upper right portion 168 from the right outer tow arm 30 overlap in the region that they couple to the yoke coupling 40. The right lower flange arm 116 second lower right portion 170 and corresponding structure from the left lower flange arm 114, the second upper left portion 160, overlap in the region where they couple to the yoke coupling 40. The overlapping regions are received between the overlapping the left upper flange 32 and the right upper flange 34 and between the left lower flange arm 114 and the right lower flange arm 116.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A tow bar assembly, comprising:
    an outer tow arm having a proximal end and a distal end,
    wherein the proximal end of the outer tow arm is configured to attach to a linkage,
    wherein the linkage is configured to attach to a towing vehicle;
    an inner tow arm having a proximal end of the inner tow arm and a distal end of the inner tow arm,
    wherein the proximal end of the inner tow arm is telescopically disposed within the outer tow arm at the distal end of the outer tow arm,
    wherein the distal end of the inner tow arm is configured to attach to a load;
    an exterior channel spanning a length of the outer tow arm on at least one side; and
    a light strip disposed within the exterior channel comprising lighting elements,
    wherein the lighting elements illuminate indicative of a mode of operation of the towing vehicle.

2. The tow bar assembly of claim 1, wherein the lighting elements are Light Emitting Diodes.

3. The tow bar assembly of claim 1, wherein the mode of operation of the towing vehicle is turning.

4. The tow bar assembly of claim 1, wherein the outer tow arm comprises an upper flange and a lower flange configured to couple to the linkage.

5. The tow bar assembly of claim 4,
    wherein the linkage comprises a yoke coupled to the upper and lower flanges by a first coupling,
    wherein the first coupling provides a first axis of rotation.

6. The tow bar assembly of claim 5,
    wherein the yoke is coupled to a two-axis coupling by a second coupling,
    wherein the second coupling provides a second axis of rotation perpendicular to the first axis of rotation,
    wherein the two-axis coupling provides a third axis of rotation perpendicular to the first axis of rotation and the second axis of rotation.

7. The tow bar assembly of claim 5, wherein the flanges contact the yoke to stop the rotation of the tow bar relative to the tow during sharp turns.

8. The tow bar assembly of claim 1, wherein the light strip is covered with a transparent cover.

9. A tow bar assembly, comprising:
    a tow arm having a proximal end and a distal end,
    wherein the proximal end of the tow arm is configured to attach to a linkage,
    wherein the linkage is configured to attach to a towing vehicle,
    wherein the distal end of the tow arm is configured to attach to a load;
    a lighting element disposed on the tow arm;
    a first interior channel disposed within the tow arm for housing electrical cables; and
    a second interior channel disposed within the tow arm for housing tow cables.

10. The tow bar assembly of claim 9, wherein the linkage comprises at least two rotatable couplings configured to separate the towing vehicle and the tow bar by at least two axes of rotation.

11. The tow bar assembly of claim 9,
    wherein an illumination of the lighting elements is indicative of a mode of operation of the vehicle;
    wherein the mode of operation of the vehicle is braking.

12. The tow bar assembly of claim 9, wherein the electrical cables provide power to the lighting element.

13. The tow bar assembly of claim 9, wherein the lighting element illuminates according to a preprogrammed sequence.

14. A tow bar assembly, comprising:
    an outer tow arm having a proximal end and a distal end,
    wherein the proximal end of the outer tow arm is configured to attach to a linkage,
    wherein the linkage is configured to attach to a towing vehicle;
    an inner tow arm having a proximal end of the inner tow arm and a distal end of the inner tow arm,
    wherein the proximal end of the inner tow arm is telescopically disposed within the outer tow arm at the distal end of the outer tow arm,
    wherein the distal end of the inner tow arm is configured to attach to a load;
    at least one lighting element disposed on the outer tow arm.

15. The tow bar assembly of claim 14, wherein the at least one lighting element illuminates indicative of a mode of operation of the towing vehicle.

16. The tow bar assembly of claim 14, wherein the mode of operation is reversing.

17. The tow bar assembly of claim 14, wherein the at least one lighting element is disposed within a lighting strip.

18. The tow bar assembly of claim 17, wherein the light strip is partially enclosed by at least one lip protruding from an edge of the exterior channel.

19. The tow bar assembly of claim 14, wherein the outer tow arm further comprises a first channel configured to house electrical wiring providing power and signals for the light strip and the load.

20. The tow bar assembly of claim 19, wherein the outer tow arm further comprises a second channel configured to house safety cables spanning from the towing vehicle to the load.

* * * * *